(12) United States Patent
Suzuki et al.

(10) Patent No.: US 7,681,902 B2
(45) Date of Patent: Mar. 23, 2010

(54) MOTOR DRIVEN STAND DEVICE FOR MOTORCYCLE

(75) Inventors: Osamu Suzuki, Saitama (JP); Kaoru Hatanaka, Saitama (JP); Syunichi Miyagishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 12/024,673

(22) Filed: Feb. 1, 2008

(65) Prior Publication Data
US 2008/0191448 A1 Aug. 14, 2008

(30) Foreign Application Priority Data
Feb. 14, 2007 (JP) ............................. 2007-033878

(51) Int. Cl.
*B62H 1/06* (2006.01)
(52) U.S. Cl. ...................................... 280/303; 280/293
(58) Field of Classification Search ................ 280/293, 280/298–304; 211/5, 22
See application file for complete search history.

(56) References Cited
U.S. PATENT DOCUMENTS

| 4,223,906 | A | * | 9/1980 | Gratza | ........................ 280/301 |
| 4,671,374 | A | * | 6/1987 | Kouyama et al. | ............ 180/219 |
| 5,100,164 | A | * | 3/1992 | Miyamaru et al. | ........... 280/301 |
| 5,234,225 | A | * | 8/1993 | Yaple | .......................... 280/293 |
| 7,140,631 | B2 | * | 11/2006 | Ridley | ......................... 280/301 |

FOREIGN PATENT DOCUMENTS

| GB | 2 174 656 A | 11/1986 |
| JP | 2001-260964 A | 9/2001 |
| JP | 2003-285784 A | 10/2003 |
| WO | WO-2004/089732 A2 | 10/2004 |

* cited by examiner

*Primary Examiner*—Lesley Morris
*Assistant Examiner*—Levon Fiore
(74) *Attorney, Agent, or Firm*—Birch, Stewart, Kolasch & Birch, LLP

(57) ABSTRACT

A motor driven stand device for a motorcycle has motors for driving stands for self-sustaining a vehicle body in a parking state in which a rear wheel is lifted and in a stopping state in which the rear wheel is contacted with the ground. A stopping switch actuates the motor for self-sustaining the vehicle body in the stopping state. A parking switch gives an instruction to the motor for self-sustaining the vehicle body in the parking state. The stopping switch is arranged in a right handlebar grip. The parking switch is arranged in a stand step and/or a grab rail. An automatic stopping control unit rotates the stands by a predetermined amount in response to an on operation of the stopping switch in an automatic stopping mode and rotates the stands for the stopping state while an on operation of the stopping switch is maintained in a non-automatic stopping mode.

17 Claims, 6 Drawing Sheets

MOTOR DRIVEN STAND DEVICE FOR MOTORCYCLE

CROSS-REFERENCE TO RELATED APPLICATIONS

The present application claims priority under 35 USC 119 to Japanese Patent Application No. 2007-033878 filed on Feb. 14, 2007 the entire contents of which are hereby incorporated by reference.

BACKGROUND OF THE INVENTION

1. Field of the Invention

The present invention relates to a motor driven stand device for a motorcycle. More specifically, the present invention relates to a motor driven stand device for a motorcycle which can change the holding state of a vehicle body with respect to the ground by differing the stroke for moving a stand in and out between at stopping and at parking.

2. Description of Background Art

As a device for self-sustaining a motorcycle at stopping, there have been known a main stand device which extends a support rod (stand) just below a vehicle body for supporting the vehicle body in a substantially erect state and a side stand device which extends a stand leftward and downward in the width direction of the vehicle body from a frame body.

The side stand device self-sustains the vehicle body by tilting it to the side on which the stand is provided (typically, the left side). A load is loaded and unloaded on/from a loading space, taking care not to permit it to slip down.

The main stand device can support the vehicle body in the substantially erect state, not requiring much care not to permit the load to slip down. The main stand device can require a large force to erect the stand with the load.

There has been devised an automatic stand device which automatically operates the main stand device using mechanical power. JP-A No. 2003-285784 discloses a stand device for a motorcycle which operates a stand using the power of a starter motor for starting an engine. This device uses a large power of the starter motor, thereby self-sustaining a vehicle body by easily lifting a rear wheel from a road.

JP-A No. 2001-260964 discloses an automatic stand device for a motorcycle which uses the power of hydraulic pressure or an air pressure cylinder for operating a stand and uses an electric motor for retracting the stand.

The side stand device is typically often used at stopping for a short time. The main stand device is often used when a motorcycle is stopped for a relatively long time in the state wherein the rider is moved away from the vehicle, that is, at parking. The motorcycle typically has both the side stand device and the main stand device. Here, operating the main stand by lifting the vehicle body requires much force. The load is required to be reduced. The motor driven stand devices described in JP-A No. 2003-285784 and JP-A No. 2001-260964 respond to this request.

At stopping at an intersection or in heavy traffic jam, a load caused when the rider puts his/her feet on the ground to hold the vehicle body is large. The load is required to be reduced.

Only the automation of the main stand device which requires a relatively large force has been studied. The side stand device which requires not-so-large a force has not been studied very much.

The side stand device is also considered to be automated. To automate both the side stand device and the main stand device, can be larger. The switch used at both stopping and parking is required to have high operability.

SUMMARY AND OBJECTS OF THE INVENTION

An object of an embodiment of the present invention is to provide a motor driven stand device which can respond to the request for automating the stand device.

According to an embodiment of the present invention, a first aspect provides a stand device for a motorcycle for automatically rotating a stand downward from a vehicle body to self-sustain the vehicle body that includes an actuator for rotating the stand downward from a predetermined retracting position so as to self-sustain the vehicle body in a parking state in which a wheel is away from the ground and a stopping state in which the wheel is contacted with the ground and returning the stand to the retracting position.

According to an embodiment of the present invention, the stand device for a motorcycle further includes a stopping switch for giving an instruction to the actuator for self-sustaining the vehicle body in the stopping state, a parking switch for giving an instruction to the actuator for self-sustaining the vehicle body in the parking state and a stand retracting switch for giving an instruction to the actuator for releasing the stopping state and the parking state to return the stand to the retracting position, wherein the stopping switch is arranged adjacent to a right handlebar grip of the vehicle and the parking switch is arranged in at least one of a stand step of the stand and a grab rail of the vehicle body.

According to an embodiment of the present invention, the stand device for a motorcycle further includes an automatic mode stopping switch for selecting an automatic stopping mode, an automatic stopping control unit, when the automatic stopping mode is selected, for rotating the stand downward by a predetermined amount in response to an on operation of the stopping switch for the stopping state and a manual stopping control unit, when the automatic stopping mode is not selected, for rotating the stand downward for the stopping state while an on operation of the stopping switch is maintained.

According to an embodiment of the present invention, the stand device for a motorcycle further includes a stand support shaft disposed to the right and left of the vehicle body that is supported at both ends by a frame body portion, a left stand and a right stand pivoted by the support shaft and swingably provided in the up and down directions, a left motor and a right motor as actuators for swingably driving the left stand and the right stand in the up and down directions, respectively, a left link mechanism for coupling an output shaft of the left motor and the left stand and a right link mechanism for coupling an output shaft of the right motor and the right stand, wherein the left link mechanism and the right link mechanism are disposed around the frame body portion downward.

According to an embodiment of the present invention, the stand device in which the stand is automatically driven by the actuator can drive the actuator, not only during parking in which the wheel is lifted to self-sustain the motorcycle, but also during stopping in which the motorcycle is self-sustained while the wheel is contacted with the ground to automatically lower the stand and can automatically return it to the retracting position. The stand device can be used during stopping at an intersection or in a traffic jam. Thus, the load caused when the rider supports the vehicle body by his/her foot at stopping can be reduced.

According to an embodiment of the present invention, the rider can operate the switch to operate the automatic stand device by the same operation as that for self-sustaining the motorcycle by a manual stand. The experience of operation for operating the main stand by pedaling the stand by foot while the handlebar grip or grab rail is grabbed to lift the vehicle body is applicable to the automatic stand device.

According to an embodiment of the present invention, the pair of right and left stands provided on the motorcycle can be independently driven by the respective exclusive motors. Thus, the motorcycle can be self-sustained on a slope. The output shaft of the motor driving the stand and the stand are coupled by the link mechanism disposed around the frame body portion for supporting the stand support shaft downward. The actuator of the stand can be arranged without greatly modifying the frame body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
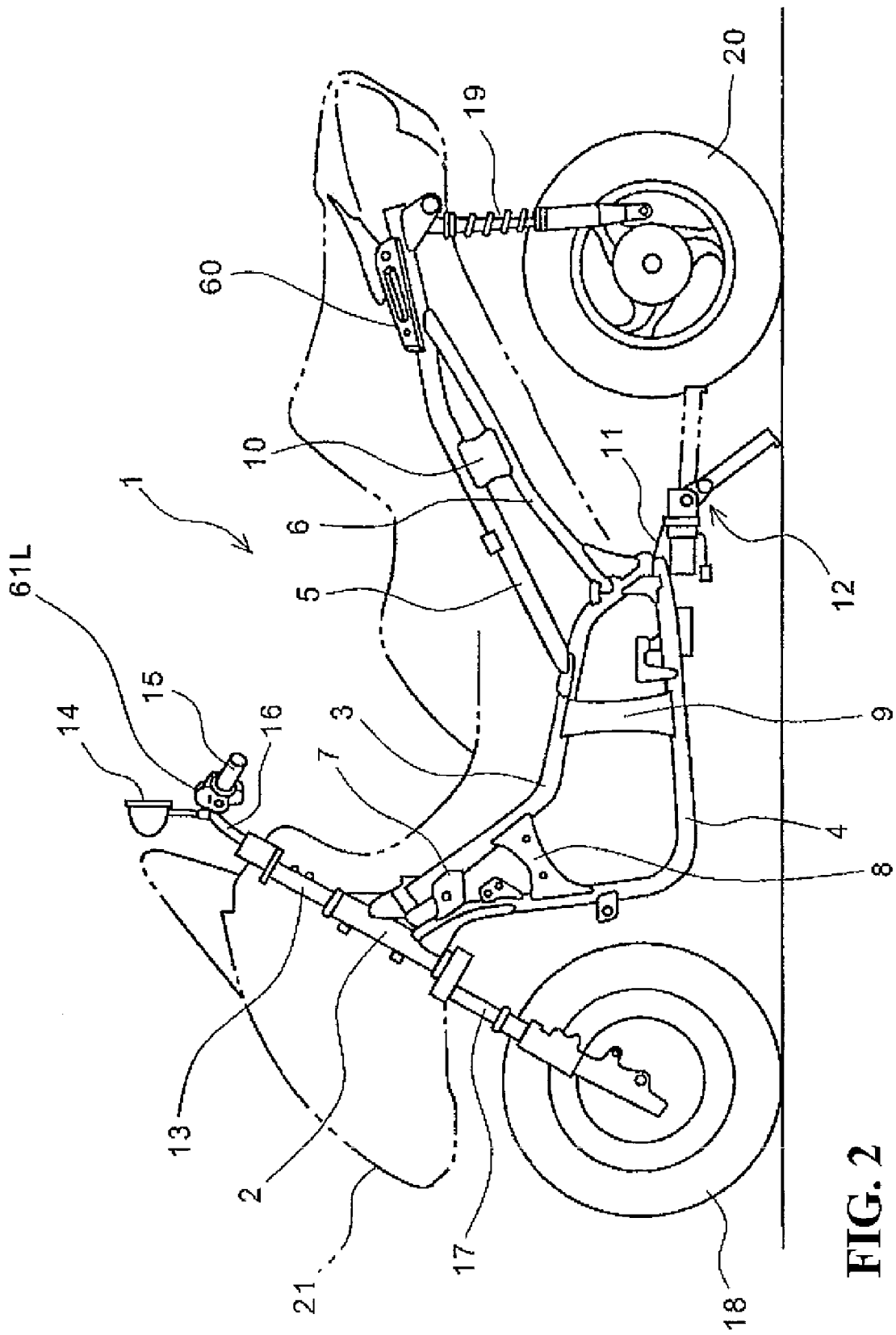
FIG. 2 is a side view showing the frame construction of a motorcycle having the stand device for a motorcycle according to an embodiment of the present invention.
Figure 3:
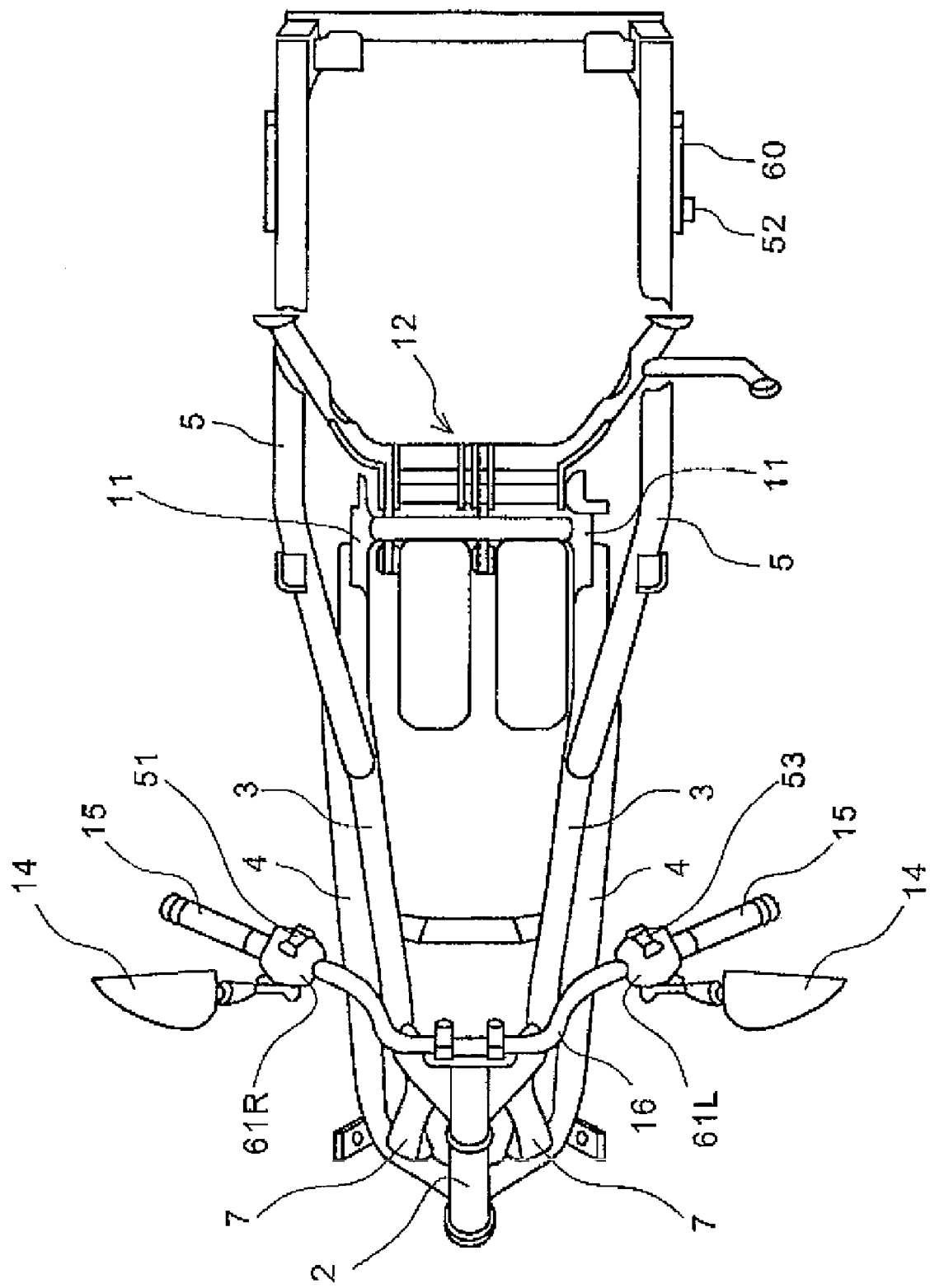
FIG. 3 is a plan view of the motorcycle having the stand device for a motorcycle according to an embodiment of the present invention.

An embodiment of the present invention will be described below with reference to the drawings. FIG. 2 is a side view showing the frame construction of a motorcycle having a motor driven stand device according to an embodiment of the present invention. FIG. 3 is a plan view. In FIG. 3, an illustration of the wheels is omitted. A frame body of a motorcycle 1 has an upper tube 3 extended downward and rearward from a head pipe 2, a lower tube 4 extended rearward below the upper tube 3, a seat tube 5 joined to the rear side of the upper tube 3 extends slightly upward and rearward, and a rear tube 6 for reinforcing the seat tube 5 is provided from below. The front ends of the upper tube 3 and the lower tube 4 are joined to the head pipe 2. Stays 7, 8, 9, and 10 are provided for giving sufficient strength for maintaining the shape of the frame and are welded to the tubes 3, 4, 5, and 6. The right and left tubes are joined by a cross member, not shown.

The rear portions of the upper tube 3 and the lower tube 4 are joined to each other. A bracket (extension portion) 11 for mounting the stand device is welded rearward from the joining portion. A stand device 12 is mounted on the bracket 11.

A steering shaft 13 is supported by the head pipe 2 so as to extend therethrough in the up and down directions. The steering shaft 13 has in its upper portion a steering handlebar 16 having a mirror 14 and grips 15 that extend to the right and left of the vehicle body. The lower portion of the steering shaft 13 is coupled to a front fork 17. A front wheel 18 is axially supported by the front fork 17.

The steering handlebar 16 has switch housings 61L and 61R for housing plural switches near the right and left grips 15. The switch housing 61L on the left side of the vehicle body houses a winker switch, a horn switch, and a stand retracting switch 53 for retracting the stand device 12 in a predetermined position. The switch housing 61R on the right side of the vehicle body houses a starter switch, an emergency stop switch, and a stopping switch 51 for moving the stand (described later) of the stand device 12 toward a ground contacted position.

A rear shock absorber 19 is suspended to the rear portion of the seat tube 5. The lower end of the rear shock absorber 19 is coupled to the rear portion of a power unit (including an engine, transmission, and reduction gear), not shown. A rear wheel 20 is supported by the power unit. A radiator 45 for circulating cooling water of the engine is arranged between the upper tube 3 and the lower tube 4 in the position just before the power unit.

The seat tube 5 has in its rear side portion a grip (grab rail) 60 used by the fellow passenger to stabilize his/her riding posture. The grab rail 60 is mounted in the same position as that suitable for use in lifting the rear portion of the vehicle body by hand during operation of a pedal type (manual) main stand device in a motorcycle on which the manual main stand device, not the stand device 12, is mounted. A parking switch 52 which moves the stand of the stand device 12 to the position in which the rear wheel 20 is moved away from the ground at parking can be incorporated into the grab rail 60. The parking switch is incorporated into the grab rail 60 so that the stand device 12 can be operated by the same operation as that of the manual main stand device for grabbing the grab rail to lift the vehicle body. The amount of rotation of the stand for moving the stand device 12 until the rear wheel 20 is moved away from the ground at parking is previously set.

A cowl or a body cover 21 is mounted on the body frame to form the outer shape of the motorcycle 1. An ECU (engine control unit), not shown, is mounted on the motorcycle 1. The ECU controls the stand device 12 based on an engine rotational speed, a vehicle speed, and switch operation for starting and retracting the stand device 12.

Figure 4:
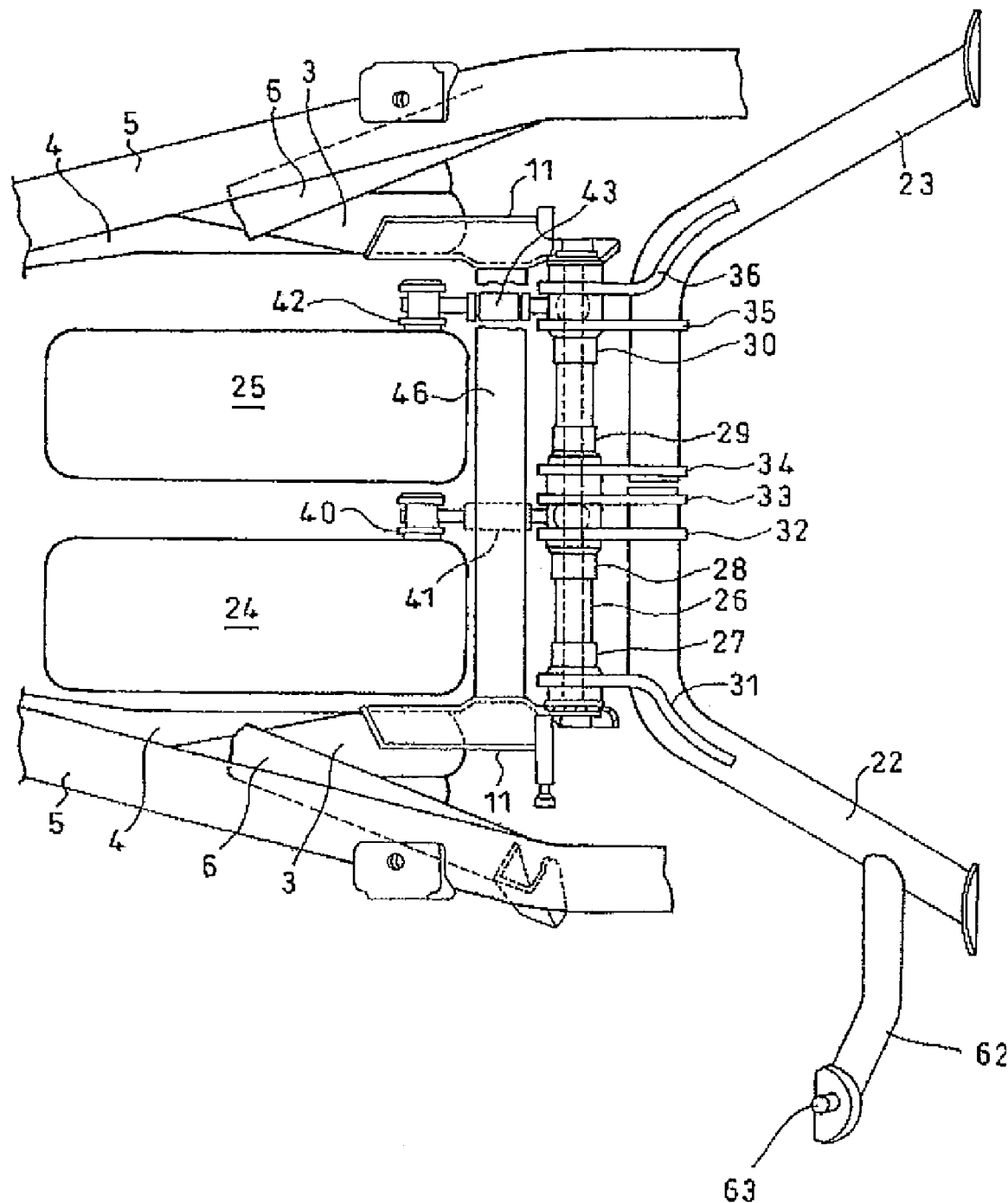
FIG. 4 is a plan view of the stand device for a motorcycle according to an embodiment of the present invention.
Figure 5:
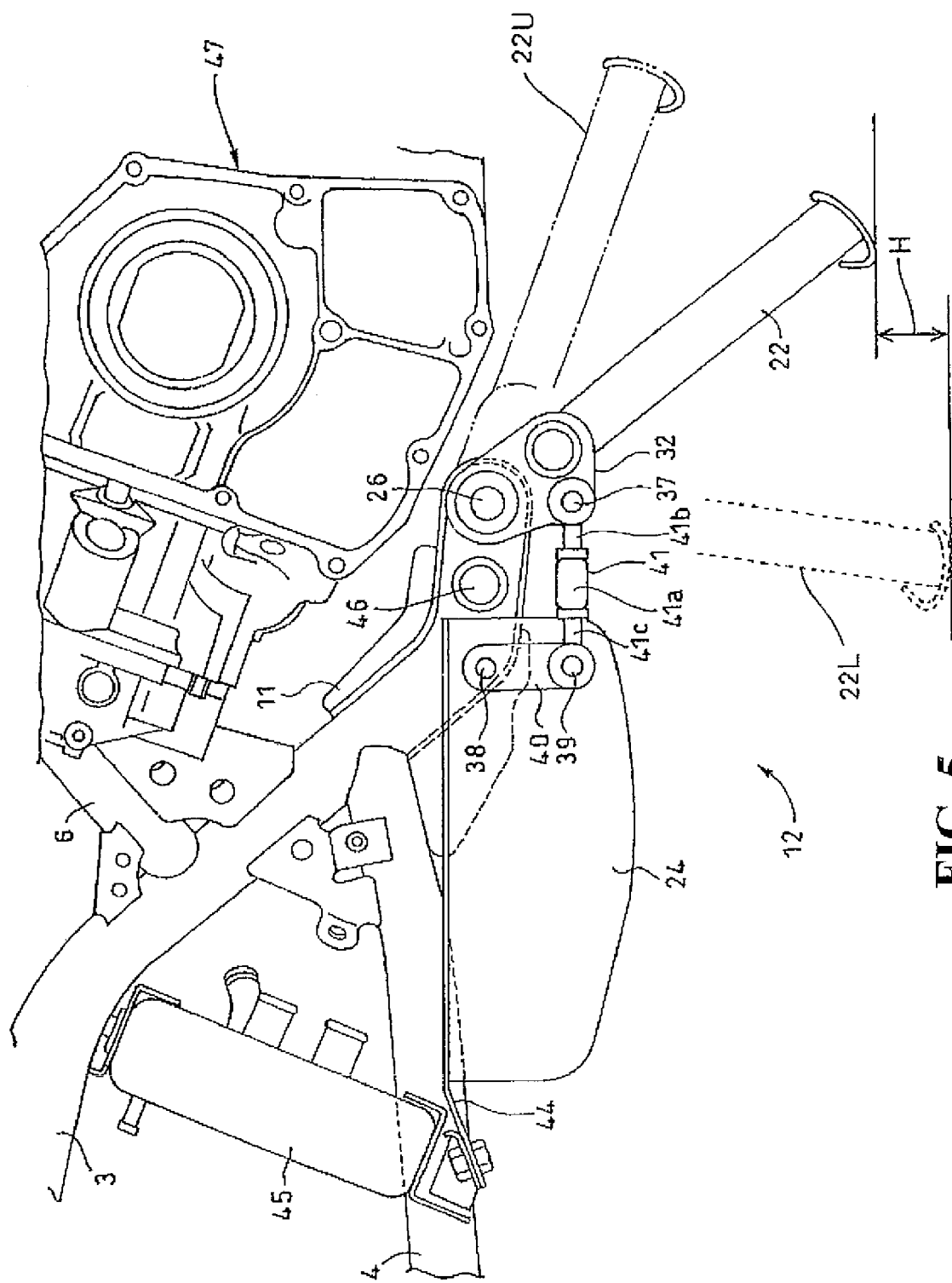
FIG. 5 is a side view of the stand device for a motorcycle according to an embodiment of the present invention.

FIG. 4 is a plan sectional view of the stand device 12. FIG. 5 is a side sectional view of the stand device 12. In both drawings, the stand device 12 has a left stand 22 positioned on the left side of the vehicle body, a right stand 23 positioned on the right side of the vehicle body, and a driving device including a left motor 24 and a right motor 25 as the respective driving sources of the left stand 22 and the right stand 23.

The left stand 22 and the right stand 23 are supported by a stand support shaft 26 and are provided so as to be swung in the up and down directions about the stand support shaft 26. The stand support shaft 26 is fixed at both ends by the right and left brackets 11 welded to the rear end of the upper tube 3. Sleeves 27, 28, 29, and 30 are play fitted on the outer peripheral surface of the stand support shaft 26. The sleeve 27 is coupled to the stand support shaft 26 by a coupling plate 31. The sleeve 28 is coupled to the stand support shaft 26 by coupling plates 32 and 33. The sleeve 29 is coupled to the stand support shaft 26 by a coupling plate 34. The sleeve 30 is coupled to the stand support shaft 26 by coupling plates 35 and 36.

The coupling plate 32 is one element of a link mechanism which transmits the power of the left motor 24 to the stand 22. A coupling pin 37 is erected on the coupling plate 32. A swing lever 40 having a coupling pin 39 is mounted on an output shaft 38 of the left motor 24. The coupling pin 39 of the swing lever 40 and the coupling pin 37 of the coupling plate 32 are coupled by a coupling rod 41.

The coupling rod 41 has a nut portion 41a and bolt portions 41b and 41c screwed to both sides thereof reversely of each other. The overall length of the coupling rod 41 can be adjusted by rotating the nut portion 41a.

The link mechanism having the coupling plate 32, the coupling rod 41, the swing lever 40, and the coupling pins 37 and 39 for the right stand 23 and the right motor 25 is constructed in the same manner as that for the left stand 22 and the left motor 24. In FIG. 4, a swing lever 42 and a coupling rod 43 for coupling the coupling plate 35 to an output shaft of the right motor 25 are shown.

The left motor 24 is mounted on a motor mounting plate 44 connected to the lower tube 4 and the bracket 11. The right motor 25 is mounted on a motor mounting plate similar to that of the left motor 24. The motor mounting plate 44 will be described later with reference to FIG. 6. The left motor 24 and the right motor 25 are arranged below the radiator 45 so as not to interrupt with the flow of cooling wind of the radiator 45.

A reinforcing tube 46 joined at both ends to the pair of right and left brackets 11 and 11 is bridged between the brackets 11 and 11 and cooperates with the stand support shaft 26 to firmly reinforce the stand support construction of the stand device 12. As shown in FIG. 2, the rear tube 6 is swingably coupled to a power unit 47 positioned above the stand device 12.

The stand 22 has near its end a stand step 62 joined toward the outside in the width direction of the vehicle body. The stand step 62 is provided by supposing the case that a load is applied to the pedal type stand by foot so that the left motor 24 and the right motor 25 can be started by the same operation as that of the case and can have a parking switch 63 provided at its end. The parking switch 63 may be provided in the grab rail 60 so as to selectively omit any one of the parking switches. Alternatively, both the parking switches may be provided in the grab rail 60, and when one of them is actuated to the operated position, its instruction is valid.

In FIG. 5, the stand 22 (ditto for the stand 23) can be swung between a lower position (hereinafter, called a "parking position") 22L indicated by the dotted line and an upper position (hereinafter, called a "stand retracting position") indicated by the alternate long and two short dashes line. The left motor 24 and the right motor 25 are connected to a control unit, not shown, and as described later, are individually energized to swing the stands 22 and 23 so as to be independent from each other.

In the parking position 22L, the rear wheel 20 is moved away from the ground. In the middle position (hereinafter, called a "ground contacted position") indicated by the solid line, the rear wheel 20 is contacted with the ground. At parking, the stands 22 and 23 are rotated to the parking position 22L so as to be moved downward. At stopping, the stands 22 and 23 are rotated to the ground contacted position. In other words, at parking, the stand device 12 is controlled so as to lift the rear wheel from the ground by a height H. When the stands 22 and 23 are in the stand retracting position 22U, the motorcycle 1 is in the runable state. A position (ground non-contacted position) is set near the ground contacted position between the ground contacted position and the stand retracting position 22U. In the later-described automatic stopping mode, the stands 22 and 23 are controlled so as to be automatically lowered to the ground non-contacted position.

Figure 6:
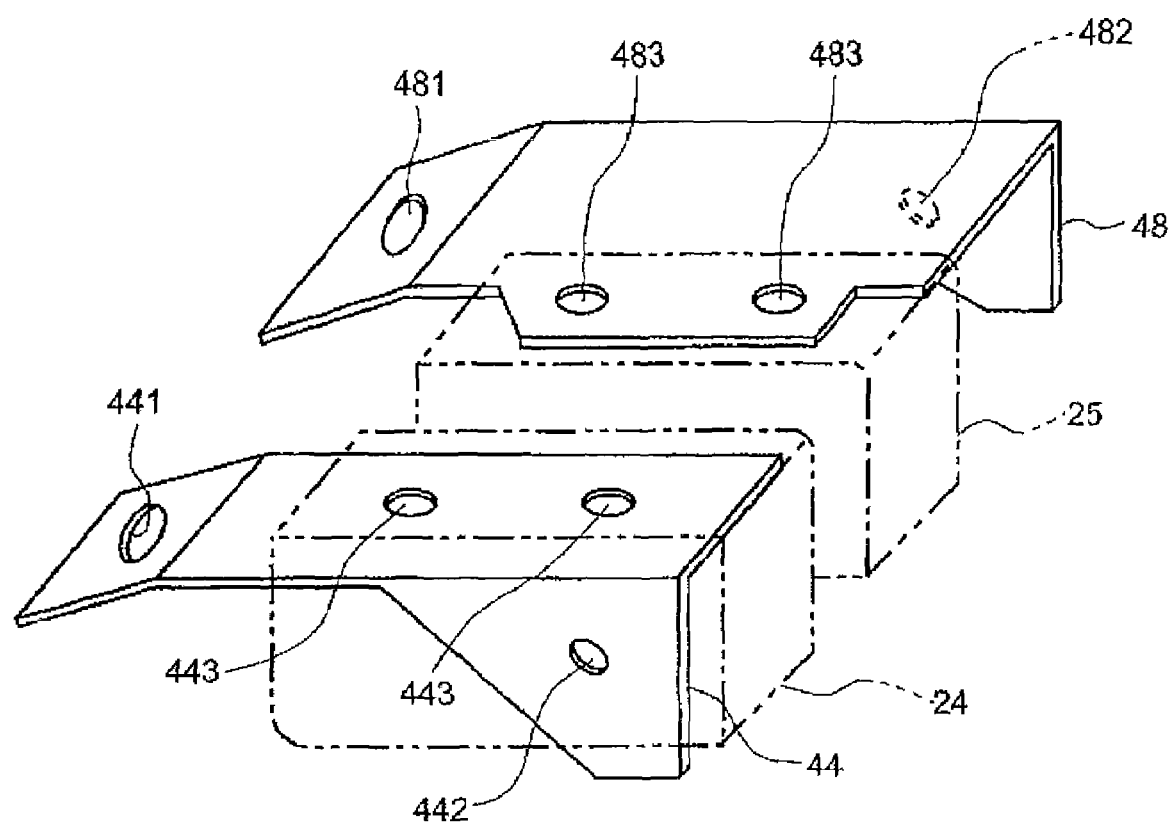
FIG. 6 is a plan view of motor mounting plates.

FIG. 6 is a perspective view of the motor mounting plates. The motor mounting plate 44 for the left motor 24 has a hole 441 for mounting the motor mounting plate 44 on the lower tube 4, a side surface hole 442 for mounting the motor mounting plate 44 on the bracket 11 on the left side of the vehicle body, and upper surface holes 443 for mounting the left motor 24 on the motor mounting plate 44. A motor mounting plate 48 for the right motor 25 has the hole 481 for mounting the motor mounting plate 48 on the lower tube 4, a side surface hole 482 for mounting the motor mounting plate 48 on the bracket 11 on the right side of the vehicle body, and upper surface holes 483 for mounting the right motor 25 on the motor mounting plate 48.

In the above construction, when the left motor 24 and the right motor 25 are driven, the respective output shafts are rotated to swing the swing levers 40 and 42. The swing of the swing levers 40 and 42 are transmitted to the coupling plates 32 and 35 via the coupling rods 41 and 43, respectively. The coupling plates 32 and 35 are swung about the stand support shaft 26. The stands 22 and 23 are swung in the range of the stand retracting position 22U and the parking position 22L.

Figure 1:
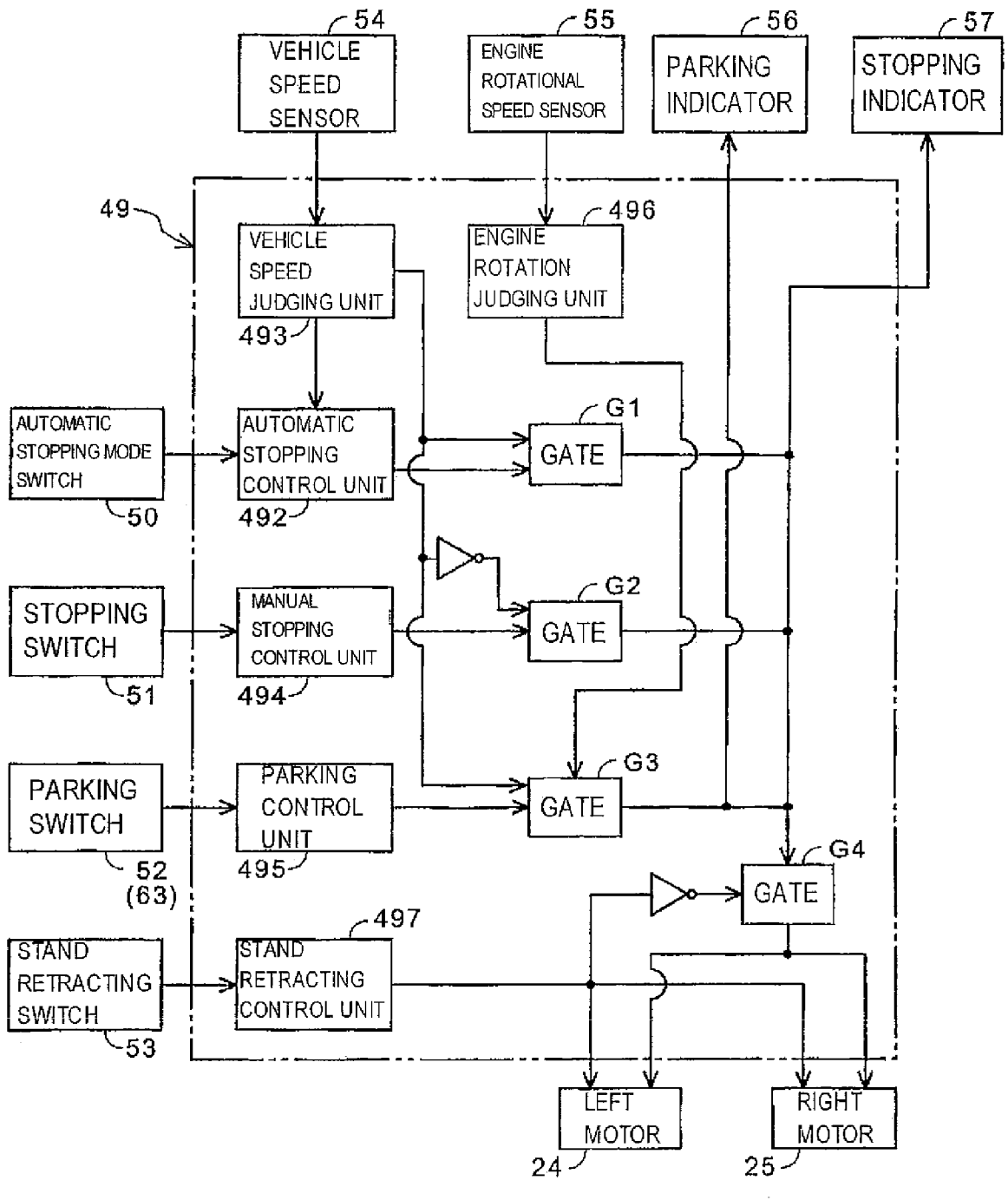
FIG. 1 is a block diagram showing the system configuration of a stand device for a motorcycle according to an embodiment of the present invention.

The control unit of the stand device 12 will be described. FIG. 1 is a block diagram showing the system configuration of the stand control unit. A stand control unit 49 is part of the function of the ECU and can be configured by a microcomputer. As means for inputting an instruction signal to the stand control unit 49, an automatic stopping mode switch 50, the stopping switch 51, the parking switch 52, and the stand retracting switch 53 are provided. The automatic stopping mode switch 50 can be provided in a meter panel provided near the steering handlebar 16 of the motorcycle 1. The stopping switch 51 is provided in the right switch housing 61R. The stand retracting switch 53 is provided in the left switch housing 61L. The parking switch 52 is provided in the grab rail 60. Here, the parking switch 52 provided in the grab rail 60 is shown. As described above, any one of the parking switch 63 provided in the stand step 62 and the parking switch 52 provided in the grab rail 60 may be used.

A vehicle speed sensor 54 and an engine rotational speed sensor 55 are provided as sensor signal input means for judging the condition allowing operation of the stand device 12. The vehicle speed sensor 54 detects the rotational speed of a gear after primary deceleration by the transmission of the engine. The engine rotational speed sensor 55 detects the rotational speed of a driving gear mounted on the crankshaft of the engine. A parking indicator 56 and a stopping indicator 57 for indicating that the stands 22 and 23 are in the parking position or the stands 22 and 23 are in the ground contacted position, respectively, are provided. Both the parking indicator 56 and the stopping indicator 57 should be provided in the mater panel.

An automatic stopping judging unit 491 of the stand control unit 49 judges whether or not the vehicle is in the automatic stopping mode, depending on whether the automatic stopping mode switch 50 is on or off. When the automatic stopping mode switch 50 is on, an automatic stopping control unit 492 is energized to input a driving signal to the left motor 24 and the right motor 25 until the stands 22 and 23 are lowered to the ground non-contacted position. The driving signal is valid when the vehicle speed is below a predetermined speed (e.g., 2 km per hour) which can be regarded that the vehicle is stopped and is invalid when the vehicle speed is above the predetermined speed. The stands 22 and 23 are returned to the stand retracting position. A vehicle speed judging unit 493 judges whether or not the vehicle speed is below 2 km per hour based on the input from the vehicle speed sensor 54. When the vehicle speed is below 2 km per hour, the vehicle speed judging unit 493 outputs a first vehicle speed signal to open a gate G1 for inputting the driving signal to the left motor 24 and the right motor 25.

When the automatic stopping control unit 492 judges that the vehicle is not in the automatic stopping mode, a manual stopping control unit 494 is energized. When the stopping switch 51 is on operated, the manual stopping control unit 494 inputs the driving signal to the left motor 24 and the right motor 25 to lower the stands 22 and 23 to the ground contacted position. Whether or not the stands 22 and 23 are contacted with the ground can be judged depending on whether or not the load of the left motor 24 and the right motor 25 is above a predetermined value. The manual stopping control unit 494 is interlocked so as to be operated according to the vehicle speed from the vehicle speed judging unit 493. When the vehicle speed is above 2 km per hour, a gate G2 is not opened and the manual stopping control unit 494 does not output the driving signal when the stopping switch 51 is actuated to an on position.

When the parking switch 52 is turned on, a parking control unit 495 inputs the driving signal to the left motor 24 and the right motor 25 to lower the stands 22 and 23 to the parking position 22L. The parking control unit 495 is energized only when the vehicle speed is 0 km per hour and the engine is stopped. The vehicle speed judging unit 493 outputs a second vehicle speed signal when the vehicle speed is below 0 km per hour. An engine rotation judging unit 496 outputs an on signal when the engine rotational speed sensor 55 does not generate an output signal, that is, when the engine is not rotated. When the on signal is inputted from both the vehicle speed judging unit 493 and the engine rotation judging unit 496, a gate G3 is opened to input the driving signal to the left motor 24 and the right motor 25.

When the stand retracting switch 53 is turned on, a stand retracting control unit 497 inputs an inverse driving signal to the left motor 24 and the right motor 25 for moving the stands 22 and 23 to the retracting position. In order that the inverse driving signal (reverse rotation signal) takes priority over the driving signal (normal rotation signal), a gate G4 is provided. When the reverse rotation signal is outputted, the normal rotation signal is not inputted to the left motor 24 and the right motor 25.

As described above, in this embodiment, the left stand 22 and the right stand 23 can be rotated from the retracting position to the stopping position and the parking position using the respective exclusive motors as actuators. The right and left stands are rotated individually. The amount of rotation of the right and left stands, that is, the amount of lowering of the stands can be changed to control the vehicle body so as to be erected on a slope. The present invention may be modified in such a manner that the stands 22 and 23 are integral and driven by a single motor. In other words, the function of the stand device responding to stopping and parking can be realized by a single device, and the operation switch of the stand device may be arranged in the steering handlebar, the stand step, or the grab rail so as to follow movement of hand and foot operating the manual stand device in the related art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor driven stand apparatus for a motorcycle for automatically rotating a stand downward from a vehicle body to self-sustain the vehicle body, comprising:

an actuator for rotating the stand downward from a predetermined retracting position so as to self-sustain the vehicle body in a parking state in which a wheel is away from the ground and a stopping state in which the wheel is contacted with the ground and returning the stand to the retracting position, and further comprising:

a stopping switch for giving an instruction to the actuator for supporting the vehicle body in the first position;

a parking switch for giving an instruction to the actuator for supporting the vehicle body in the second position; and a stand retracting switch for giving an instruction to the actuator for releasing the second position and retracting the stand to the third position, wherein the stopping switch is arranged adjacent to a right handlebar grip of the vehicle and the parking switch is arranged in at least one of a stand step of the stand and a grab rail of the vehicle body.

2. The motor driven stand apparatus for a motorcycle according to claim 1, further comprising:

an automatic mode stopping switch for selecting an automatic stopping mode;

an automatic stopping control unit, when the automatic stopping mode is selected, for rotating the stand downward by a predetermined amount in response to an on operation of the stopping switch for the stopping state; and a manual stopping control unit, when the automatic stopping mode is not selected, for rotating the stand downward for the stopping state while an on operation of the stopping switch is maintained.

3. The motor driven stand apparatus for a motorcycle according to claim 1, further comprising:

a stand support shaft disposed to the right and left of the vehicle body and supported at both ends by a frame body portion;

a left stand and a right stand pivoted by the support shaft and swingably provided in the up and down directions;

a left motor and a right motor as actuators for swingably driving the left stand and the right stand in the up and down directions, respectively;

a left link mechanism for coupling an output shaft of the left motor and the left stand; and a right link mechanism for coupling an output shaft of the right motor and the right stand;

wherein the left link mechanism and the right link mechanism are disposed around the frame body portion downward.

4. A motor driven stand device for a motorcycle for automatically rotating a stand downward from a vehicle body to self-sustain the vehicle body, comprising:

an actuator for rotating the stand downward from a predetermined retracting position so as to self-sustain the vehicle body in a parking state in which a wheel is away from the ground and a stopping state in which the wheel is contacted with the ground and returning the stand to the retracting position;

a stand support shaft having a first end secured to a left side of a frame and a second end secured to a right side of the frame, said stand being directly supported on said support shaft for rotation relative thereto, said actuator being operatively connected to said stand to rotate said stand about the support shaft; and a swing lever having a first end directly connected to a output shaft of the actuator and a second end directly connected to a coupling rod for transmitting a rotation from said actuator to rotate said stand.

5. The motor driven stand device for a motorcycle according to claim 4, wherein said coupling rod includes an adjustable portion for adjusting the overall length of the coupling rod to accommodate for a distance between the swing lever and the stand.

6. The motor driven stand device for a motorcycle according claim 4, and further including a coupling plate operatively connected to the support shaft, the stand and the swing lever for transmitting the rotation from the actuator to rotate the stand.

7. The motor driven stand device for a motorcycle according claim 4, wherein a left stand and a right stand are supported on said support shaft for rotation relative thereto.

8. The motor driven stand device for a motorcycle according to claim 7, wherein the actuator includes a left actuator and a right actuator, said left actuator being operatively connected to the left stand for transmitting rotation from the left actuator to the left stand and the right actuator being operatively connected to the right stand for transmitting rotation from the right actuator to the right stand.

9. A motor driven stand device apparatus adapted to be used with a vehicle body comprising:
  a stand adapted to be operatively connected to the vehicle body for selectively supporting the vehicle body;
  an actuator operatively connected to the stand for rotating the stand from a predetermined retracting position so as to support the vehicle body in a first position wherein the vehicle is stopped and a wheel is in engagement with a ground surface to a second position wherein the wheel is away from the ground and to a third position wherein the stand is retracted and wherein the wheel is in contact with the ground, and
  further comprising:
  a stopping switch for giving an instruction to the actuator for supporting the vehicle body in the first position;
  a parking switch for giving an instruction to the actuator for supporting the vehicle body in the second position; and
  a stand retracting switch for giving an instruction to the actuator for releasing the second position and retracting the stand to the third position.
  wherein the stopping switch is arranged adjacent to a right handlebar grip of the vehicle and the parking switch is arranged in at least one of a stand step of the stand and a grab rail of the vehicle body.

10. The motor driven stand apparatus adapted for use with a vehicle body according to claim 9, further comprising:
  an automatic mode stopping switch for selecting an automatic stopping mode;
  an automatic stopping control unit, when the automatic stopping mode is selected, for rotating the stand downward by a predetermined amount in response to an on operation of the stopping switch for the first position; and
  a manual stopping control unit, when the automatic stopping mode is not selected, for rotating the stand downward for the first position while an on operation of the stopping switch is maintained.

11. The motor driven stand apparatus adapted for use with a vehicle body according to claim 9, further comprising:
  a stand support shaft disposed to the right and left of the vehicle body and supported at both ends by a frame body portion;
  a left stand and a right stand pivoted by the support shaft and swingably provided in the up and down directions;
  a left motor and a right motor as actuators for swingably driving the left stand and the right stand in the up and down directions, respectively;
  a left link mechanism for coupling an output shaft of the left motor and the left stand; and
  a right link mechanism for coupling an output shaft of the right motor and the right stand;
  wherein the left link mechanism and the right link mechanism are disposed around the frame body portion downward.

12. The motor driven stand apparatus adapted for use with a vehicle body according to claim 9, and further including a stand support shaft having a first end secured to a left side of a frame and a second end secured to a right side of the frame, said stand being directly supported on said support shaft for rotation relative thereto, said actuator being operatively connected to said stand to rotate said stand about the support shaft.

13. The motor driven stand apparatus adapted for use with a vehicle body according to claim 12, and further including a swing lever having a first end directly connected to a output shaft of the actuator and a second end directly connected to a coupling rod for transmitting a rotation from said actuator to rotate said stand.

14. The motor driven stand apparatus adapted for use with a vehicle body according to claim 13, wherein said coupling rod includes an adjustable portion for adjusting the overall length of the coupling rod to accommodate for a distance between the swing lever and the stand.

15. The motor driven stand apparatus adapted for use with a vehicle body according to claim 4, and further including a coupling plate operatively connected to the support shaft, the stand and the swing lever for transmitting the rotation from the actuator to rotate the stand.

16. The motor driven stand apparatus adapted for use with a vehicle body according to claim 12, wherein a left stand and a right stand are supported on said support shaft for rotation relative thereto.

17. The motor driven stand device apparatus for use with a vehicle body according to claim 16, wherein the actuator includes a left actuator and a right actuator, said left actuator being operatively connected to the left stand for transmitting rotation from the left actuator to the left stand and the right actuator being operatively connected to the right stand for transmitting rotation from the right actuator to the right stand.

* * * * *